United States Patent Office 3,642,963
Patented Feb. 15, 1972

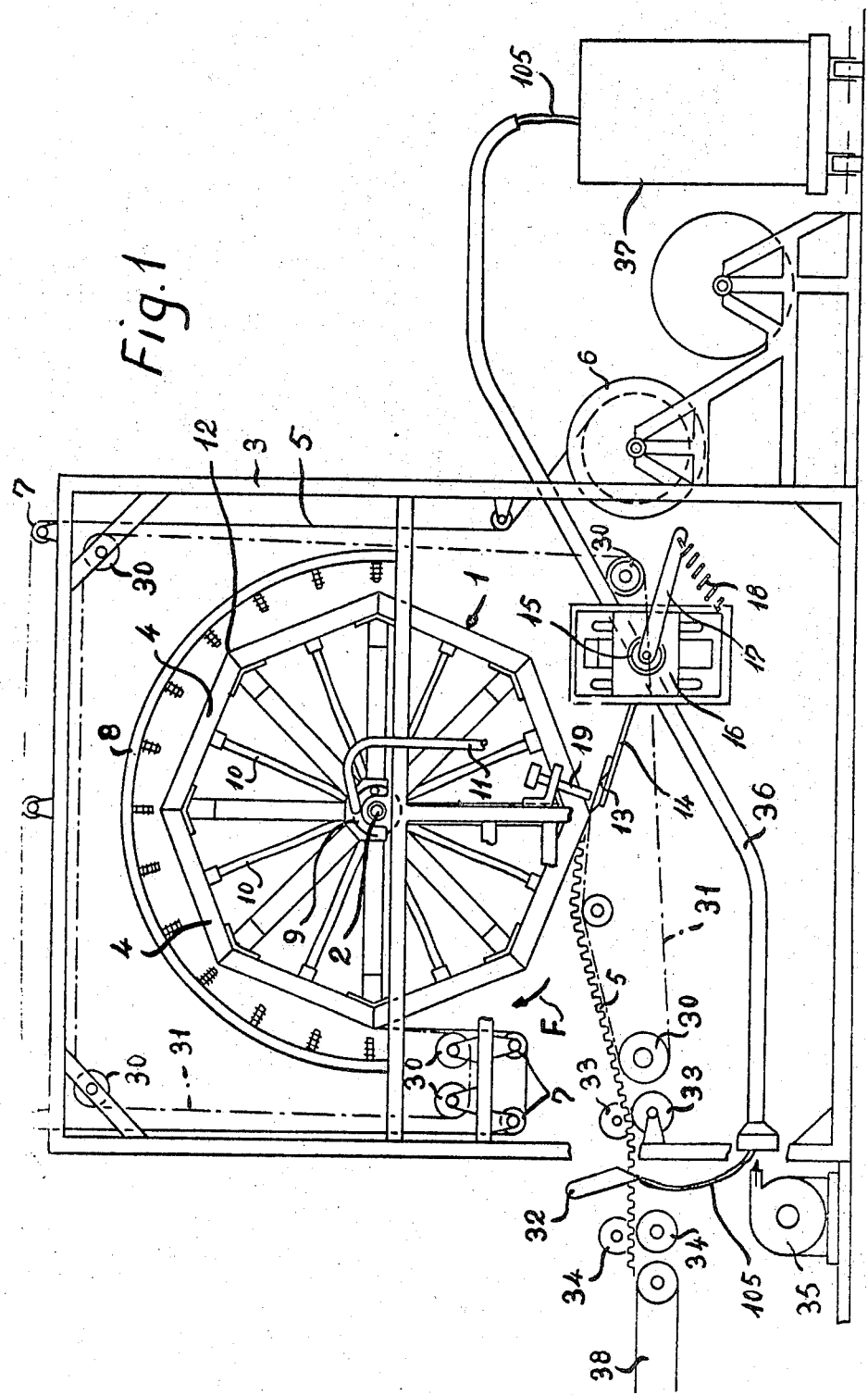

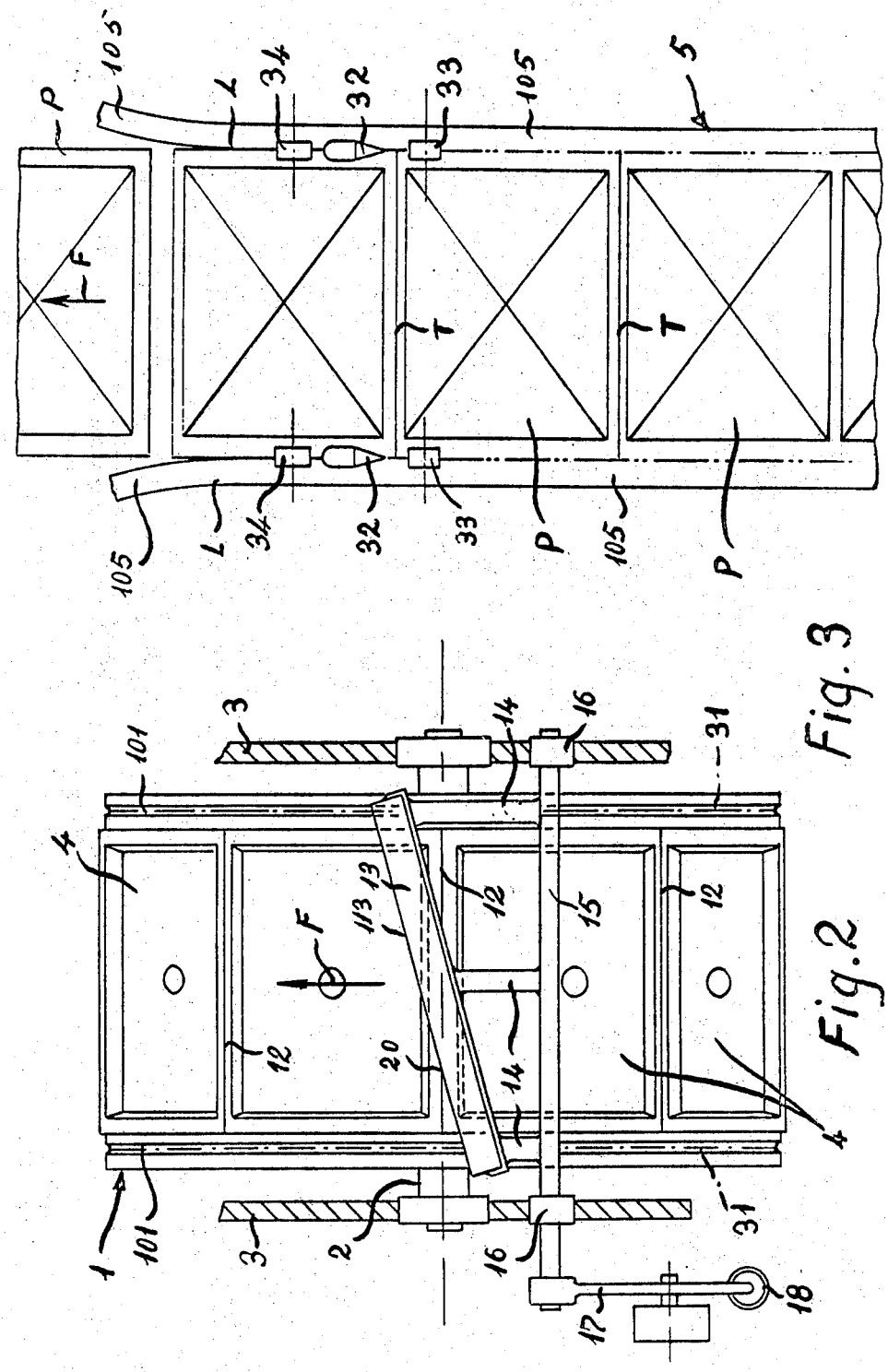

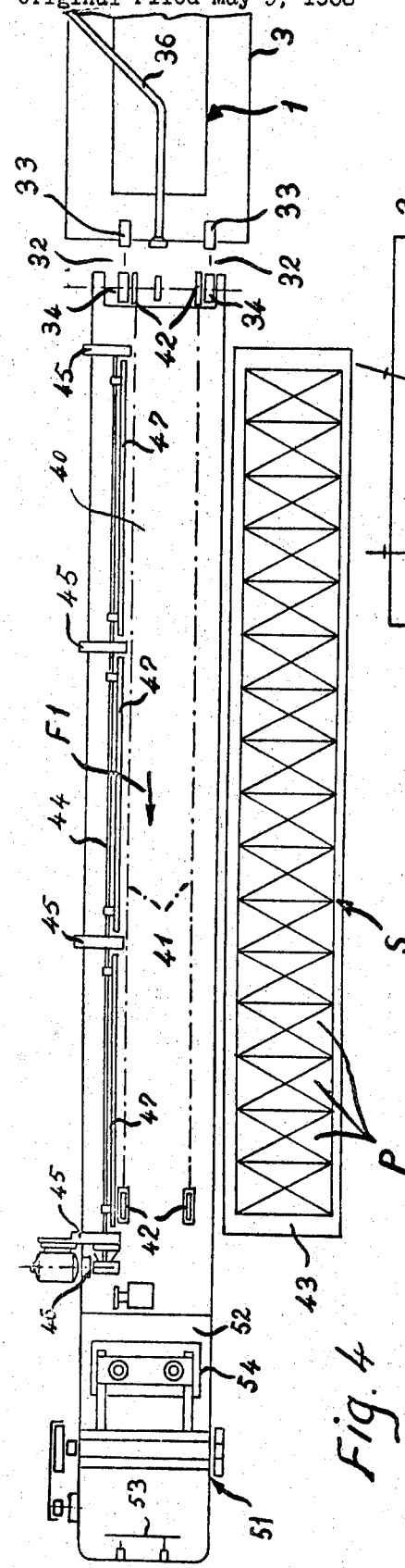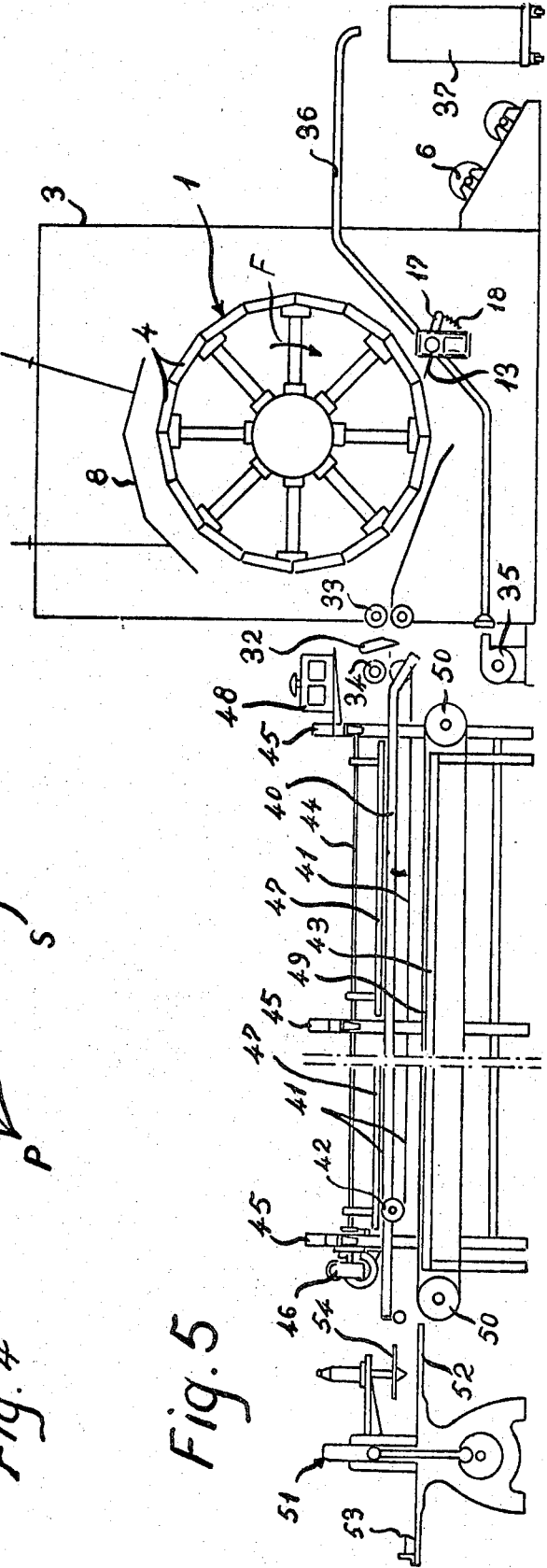
Fig. 4
Fig. 5

3,642,963
METHOD OF SEVERING ARTICLES FROM A CONTINUOUS THERMOPLASTIC WEB MOLDED ON ROTARY VACUUM-FORMING MACHINES
Guido Martelli, Piazza XX Settembre 5; Nerio Martelli, Via Cavaioni 6; and Francesco Martelli, Piazza XX Settembre 5, all of Bologna, Italy
Original application May 9, 1968, Ser. No. 727,990. Divided and this application Dec. 9, 1969, Ser. No. 880,514
Int. Cl. B29c 17/00, 17/14
U.S. Cl. 264—37      3 Claims

ABSTRACT OF THE DISCLOSURE

Apparatus for severing articles molded in a web of thermoplastic material in vacuum-forming machines comprising a rotary drum on the periphery of which mold are mounted under the action of heating and suction means, the said web being first cut into quadrangular sections by co-action of cutting edges provided transversally on the drum with swinging cutter means mounted in proximity of the same drum. Whenever a further cutting of the single articles from said quadrangular section of web is desired, said sections are piled up in a convenient number and from said piles of web sections piles of single articles are cut off by means of reciprocating cutters, which may have shaped cutting edges.

---

This application is a divisional application of Ser. No. 727,990, filed May 9, 1968, entitled "Apparatus for Severing Articles from a Continuous Thermoplastic Web Molded on Rotary Vacuum-Forming Machines."

This invention relates to the severing of single articles produced by vacuum-forming of continuous thermoplasic sheets or webs on rotary machines and aims to provide means for the quick and reliable severing of hollow articles having a contour whatsoever and produced in a continuous web of thermoplastic material.

According to the invention, if the articles to be cut have a quadrangular, and preferably rectangular shape and are produced by vacuum-forming of a continuous web, the molds for forming said web are mounted upon suitable frames or supporting trays. The drum thus assumes the shape of a bottomless polygonal prism, the faces of which are formed by the molds and by which the severing of the single articles—or of a plurality of them, as the case may be—formed by sucking into the molds the heat-softened web is effected by providing between at least two of the molds a cutting edge and by providing a swinging blade adapted to be swung into contact with said drum cutting edge or edges, so as to wander from one end of said cutting edge to the opposite one, thus effecting a clean cut of the vacuum-formed web in correspondence of the lap between two molds resting upon said cutting edge.

Furthermore, according to the invention, whenever the articles to be cut are of relatively small dimensions, or have a non-rectangular shape, upon said vacuum-forming drum the web is cut into rectangular sections, each comprising a plurality of articles still attached to the parts of the web remaining outside the vacuum-forming molds.

From these rectangular web sections the plurality of vacuum-formed articles may be severed from each other or from the web laps connecting same together in form of a continuous web, by bringing same under a reciprocating cutter, whose blade may have any profile, so as to be able to sever even non-polygonal pieces or articles.

According to another optional characteristic feature of the invention, the rectangular web sections containing each a plurality of pieces or articles connected together by means of web laps before being severed may be heaped or piled up and the piles formed each of a plurality of said sections are then brought under the reciprocating cutter, where a plurality of piled single pieces or articles—for example tumblers of plastic material—are severed with a single cutter blow.

The invention will be particularly described for the case of first cutting the web into rectangular sections, each formed preferably from a plurality of single articles, then heaping up said rectangular sections so as to form section piles and then bringing said piles under a reciprocating cutter so as to cut off therefrom piles of articles severed from the connecting web lap.

The invention will be better understood from the following specification relating to one preferred embodiment of the invention, which will be described in connection with the accompanying drawings, wherein:

FIG. 1 diagrammatically shows in side elevation a rotary machine for the continuous vacuum-forming of thermoplastic webs and provided with an apparatus according to the invention for cutting the web into rectangular sections;

FIG. 2 is a bottom view of the mold-carrying drum of the rotary machine and of the cutter blade for severing the thermoplastic web in correspondence of one of the cutting drum edges;

FIG. 3 diagrammatically shows how rectangular pieces are severed from the vacuum-formed web by effecting incomplete transversal cuttings upon the cutting edges of the drum and by effecting two parallel trimming cuts at the web margins;

FIGS. 4 and 5 diagrammatically show, in plan view and in side elevation, an apparatus for piling or heaping-up rectangular sections of formed thermoplastic webs, delivered from a rotary machine according to FIGS. 1 and 2 and each comprising a plurality of single articles and a reciprocating cutter for severing the single articles from said rectangular sections.

With reference to the figures, the continuous rotary machine for the vacuum-forming of heat-softened continuous thermoplastic webs is of the kind comprising a drum 1 mounted upon a horizontal shaft 2 rotatably supported on frame 3 and driven through a conventional step-down gear (not shown) so as to revolve at suitable speed in the direction of arrow F.

Upon the periphery of the drum 1 substantially plane mold-carrying trays 4 are mounted, which confer to said drum a polygonal shape. In each tray 4 a conventional suction-forming mold (not shown) is removably supported. Said mold is provided, as usual, with suction holes, which open in a suction chamber formed between the tray and the mold bottom.

The continuous thermoplastic web 5 is unrolled from a roll 6 and, after passing upon transmission rollers 7 is caused to pass around drum 1, by winding itself tightly around a certain section thereof, for example around its top half, where a heater device 8 is arranged, which may be formed for example by electric resistances and is adapted to heat up the thermoplastic web 5 on drum 1, until it becomes plastic. The machine comprises further an automatic suction-distributing device 9 for connecting the chambers in correspondence of the mold-supporting trays 4 which come to be under the heater 8, by means of tubes 10 and connects same for a short time to the suction duct 11 of an air pump (not shown), thus promoting the suction of the heat-softened web 5 into the molds and consequently its vacuum-forming. Successively, the vacuum distributor 9 connects the chambers of the single mold-carrying trays 4 for a short time with the atmosphere, thus eliminating the vacuum and permitting to the molded web to be detached from the molds on drum 1.

In order to ensure the adherence of the thermoplastic web 5 onto the mold-carrying drum 1 and to ensure the air tightness between the drum 1 and web 5 during the suction of this latter into the molds, around the mold-carrying drum 1 there are passed through grooved pulleys 30 two endless cords or chains 31 shown by dotted lines and mounted in proximity of the drum ends. These cords or chains 31 compress the two side margins of the web 5 into suitable peripheral annular drum grooves 101, so that the continuous web 5 to be molded is first readily pinched between drum 1 and the pinching members (cords or chains) 31 and subsequently the already molded web is detached from the drum 1 together with the said pinching members 31, as it is apparent in FIG. 1.

Peripherally, upon the mold-carrying drum 1, between the mold-carrying trays 4, transversal cutter edges 12 are provided, which may be constituted by ribs or by the edges of the prismatic peripheral drum frame. With these cutting edges 12 co-acts a cutter blade 13 swingably mounted upon the machine frame 3 and arranged past the section in which the thermoplastic heat-softened web is sucked into the molds upon the drum 1, and also past the heater 8, preferably a little ahead of the section where the thermoplastic web is detached from the drum 1. The cutter blade 13 extends substantially in the direction of the revolving axis of the drum 1 and is fastened, by means of an arm 14 to a shaft 15 substantially parallel to the drum axis and rotatably mounted in bearings 16 which, in their turn, are mounted in the machine frame 3 so as to be shifted and adjusted with respect to the drum 1. The shaft 15 on which the cutter blade 13 is mounted is provided with another arm 17 to which one end of a spring 18 is anchored, the opposite end of which spring is anchored to a fixed part. This spring 18 tends to rock the blade 13 towards the mold-carrying drum 1, with its cutting edge 113 inclined with respect to the drum cutting edges 12, as it appears in FIG. 2. Upon the machine frame 3, on each side of drum 1, an abutment screw 19 is mounted, which co-acts with the respective end of the cutter blade 13. These screws 19 constitute stop members for the cutter blade 13 and are adjusted in such a manner, as to operate as follows:

When, during the rotation of the drum 1 upon the cutting edge 113 a mold-carrying tray 4 passes, the cutter blade 13, urged by the spring 18, bears upon the abutment screws 19 and its cutting edge 113 comes to be spaced from the mold housed in the mold-carrying tray 4, i.e. it does not interfere with the thermoplastic web 5 which bears on the mold and is sucked thereinto. When, on the contrary, upon the cutting edge 113 of the blade 13 a cutting edge 12 of the mold-carrying drum 1 passes, said cutting edge 12 comes into contact with the cutter edge 113 and lifts the blade 13 clear of the abutment screws 19, against the action of spring 18. The cutter blade 13 thus bears with its cutting edge 113 against the cutting edge 12 of the drum and comes to be elastically pressed thereagainst by spring 18.

Due to the inclination of the cutter blade 13 with respect to the cutting edge 12 of drum 1, this cutting edge 12 comes into contact with the cutter edge 113 of cutter blade 13 first in correspondence of one of its ends, and practically in a single point 20. By the rotation of drum 1, this contact point wanders along the cutting edge 12 up to the opposite end thereof, thus effecting the transversal cut of the section of thermoplastic web 5 upon the cutting edge 12.

After the cutting, when the edge 12 of the drum 1 is clear of the cutter edge 113 of blade 13, this, due to the spring action, is again urged towards the drum 1, until it abuts against the abutment screws 19, on which it bears until it is again lifted from the successive cutting edge 12, in correspondence of which the subsequent transversal cut of the thermoplastic web 5 is effected.

As it is apparent from FIG. 2, the cutting edges 12 of the drum 1 do not usually extend along the whole width of the thermoplastic web 5, but terminate at both sides at a certain distance from the longitudinal margins of the web, before the marginal parts of same which are engaged by the pinching members 31. Consequently, also in order to avoid that the cut pieces bear at their margins the inprints of said pinching members, the transversal cuts do not extend through both sides of the web, but terminate on both sides at a certain distance from the longitudinal ends of the web 5. Thus a longitudinal marginal strip 105 is left uncut on both web margins, as shown by dotted line in FIG. 3, so that it is possible to withdraw and detach the molded web 5 from the mold-carrying drum 1, as a continuous band and without difficulty or auxiliary devices, notwithstanding the provision of the transversal cuts T.

Successively, after the thus molded web provided with the incomplete transversal cuts T has been detached from the drum 1, the strips 105 are cut off by means of two longitudinal side trimmings L effected by two corresponding cutters 32, which trimmings intersect the ends of the transversal cuts T, as shown in FIG. 3. The trimming cutters 32 are adjustably and dismountably fastened to the machine frame 3, between two roller pairs 33, 34, which engage the respective marginal part of the web 5 at both sides of the corresponding longitudinal trimming line L. The detached marginal strips 105 which are severed from the web 5 by the trimming cuts L are each blown off by a blower 35 into a duct 36 and are discharged into a bin 37.

In case of the production of rectangular articles, such as fruit trays, as shown in the embodiment according to FIGS. 1 through 3, between each pair of successive mold-carrying trays 4 a cutting edge 12 may be provided and the cutter blade 13 by co-acting with each of these cutting edges 12 and after the side trimming by means of a pair of longitudinal trimming cuts L have been effected, severes the single rectangular articles P. These articles P may be laid the one after the other upon a suitable conveyor 38 and conveyed to a heaping and packaging section or to a further processing.

In the case of non-rectangular articles, for example tumblers (not shown) or in case of the provision of multiple molds, i.e. each corresponding to two or a plurality of successive products P, forming together sections S, each of which comprises a plurality of products P, as shown in FIG. 4, upon the mold-carrying drum 1 only one or a limited number of transversal cutting edges 12 may be provided, or otherwise control means might be provided for effecting a transversal cut after a plurality of vacuum-formed products P.

In each of the above-outlined cases, past the cutting device 32, 33, 34 which effects the two longitudinal trimming cuts L, consecutive web sections S are obtained each of which may consist of a plurality of products P which may be rectangular, as shown, or may have any profile within each rectangle P, the rectangles being connected between them on the whole width of the web section S.

In order to avoid that a conspicuous number of separate single pieces be produced, thus occupying much space and requiring considerable hand labor for collecting and packaging in sets of a predetermined number of articles, the web sections S are piled up in a predetermined number and subsequently in the heaps or piles of web sections S the products P which may have any shape, and may be for example tumblers having a circular cross section, may be severed from the web connecting same together by means of a reciprocating cutter, the whole as shown in FIGS. 4 and 5. In these figures, the web sections S coming from the rotary machine are conveyed on a table 40 by the upper run of a conveyor composed of endless cords or belts 41 tensioned between transmission sheaves or pulleys 42 and running upon a table 40 parallel and flush thereto, in longitudinal direction and preferably at a speed which is greater than the peripheral speed of the mold-carrying drum 1. The web sections S coming out of the rotary machine are laid the one after the other upon the conveyor belts 41 on table 40 and are entrained thereby along the table 40.

Sidewise of the afore-described delivery device, upon one of its sides, a pile-up table 43 is provided the plane of which comes to be at a lower level than table 40. Upon the delivery table 40 a device is mounted for transferring the single web sections S in a transversal direction from the delivery table 40 to the pile-up table 43. In the embodiment as shown, the said transversal transfer device comprises a shaft 44 which extends along the delivery table 40 on the side opposite to the pile-up table 43 and is rotatably mounted upon small pillars 45. The shaft 44 is driven through a step-down gear 46 and carries blades 47 extending in longitudinal direction and fastened upon radial arms. Normally, the shaft 44 of the transfer device is stopped in such a rest position, that the blades 47 thereof do not interfere with the web section S advancing upon the table by the action of the conveyor belts 41. Whenever a web section S comes to be completely upon the table 40 of the delivery device, the shaft 44 effects one complete revolution in such a direction, that its blades 47 abut against the edges of the web section S which is opposite to the pile-up table 43 and push the web section S transversally away from the delivery table 40 thus causing same to fall down upon the adjoining pile-up table 43 and then stopping again in its rest position.

The operation of the transfer device, that is the intermittent rotation of the shaft 44 provided with blades 47 may be semiautomatic, i.e. they may take place under the control of the operator which comes to be before the pile-up table 43, or also they may be completely automatic, viz they may take place under the control effected for example through an electric contact, provided for this purpose, cyclically by the mold-carrying drum 1 or by means of a suitable feeler, from the web section S advancing upon the delivery table 40.

Upon the pile-up table 43 the successive web sections S, fed by the transversal transfer device 44, 46, 47 are orderly superposed and encased the one into the other, so as to form a pile composed of a predetermined number of these web sections S. In the embodiment as shown, the piling-up operation is effected by hand by one or more operators.

When a pile of web sections S is formed, it is successively transferred in transversal direction, either manually by the operator or operators, from the piling-up table 43 upon a continuous endless belt conveyor 49, which is tensioned between the rollers 50 and is mounted at the side of the piling-up table 43, substantially co-planarly thereto and under the delivery table 40. This conveyor 49 extends in longitudinal direction of the tables 40, 43 by running in the same direction F1 as the delivery conveyor 41 and causes the pile of web sections S to advance towards a cutter 51 which may be shaped and which provides to cutting from said pile of web sections S a number of piles of single articles P.

In embodiment as shown, the cutter 51 is of the reciprocating type, having an automatic control effected by the same pile of web sections S to be cut. The table 52 of the cutter 51 is co-planar to the feed conveyor 49. The fed pile of web sections S passes under the lifted cutter blade and comes with its front end to abut against a feeler 53 which promotes the lowering of the blade and the cutting of the pile of articles P. Together with the blade, also a spring-yielding abutment member 54 is lowered, which is mounted on the rear end of the cutter 51, that is upon the side of the feed conveyor 49. The abutment member 54 by being lowered engages the pile of web sections S and stops same upon the table 52 of the cutter 51, against the action of the belt conveyor 49 which tends to entrain same forwards and continues its running under the stopped pile. Preferably, the abutment member 54 presents on its lower face a shape which is complementary to at least a part of a product P and engages itself into a product P of the pile of web sections S, so as to stop said pile without an excessive compression.

After the cutting of the products P from the pile of web sections S, the cut piled products are removed, manually or mechanically, by means of a suitable transversal ejector and the blade of the cutter 51 is lifted together with the abutment member 54, by leaving the pile of web sections S free, which again advances by a further step corresponding to a product unit P, by the action of the feed conveyor 49 and until abutment of the feeler 53, when the above-described cutting operation is automatically repeated.

Of course, the invention is not limited to the embodiments as described and shown, but may be amply varied and modified above all as regards the constructive realisation of the various devices. Thus, in case of rectangular fruit—or like trays, the cutting edges 12 may extend between the molds on the drum on the whole wed width, thus avoiding the subsequent operation of trimming of the margins. Furthermore, in case of the production of other shaped articles, means might be provided for blowing or scavenging away the web parts which surrounded the cut articles.

We claim:

1. The method of forming rigid trays from a continuously moving web of thermoplastic material, the steps of:
    (a) introducing an unheated planar sheet of thermoplastic material to a surface of a traveling drum,
    (b) heating the thermoplastic material until it becomes deformable,
    (c) applying a vacuum to the deformable web to draw it into mold depressions provided in the drum to form a continuous series of interconnected trays,
    (d) advancing the molded drum conforming web into an area of the drum not under the influence of the vacuum,
    (e) introducing the preformed web with its array of molded trays as a group in a longitudinal direction to a conveying mechanism,
    (f) transferring the array of grouped trays transversely from the conveying mechanism onto a table to form superposed piles of assembled tray groups,
    (g) longitudinally moving the assembled pile of trays onto a second conveying mechanism, and thereafter,
    (h) cutting the pile of web sections transversely between the respective adjoining edges of the array of trays to form piles of individual trays.

2. A method according to claim 1, wherein the longitudinal motion of the web sections automatically triggers the cutting operation.

3. The method of forming rigid trays from a continuously moving web of thermoplastic material, the steps of:
    (a) introducing an unheated planar sheet of thermoplastic material to a surface of a traveling drum,
    (b) heating the thermoplastic material until it becomes deformable,
    (c) applying a vacuum to the deformable web to draw it into mold depressions provided in the drum to form a continuous series of interconnected trays,
    (d) advancing the molded drum conforming web into an area of the drum not under the influence of the vacuum,
    (e) severing the traveling web at predetermined spaced locations between the trays, to provide separable atmospherically cooled tray groups,
    (f) trimming the web of material inwardly of and along its oppositely disposed longitudinally traveling edges to remove the waste product and produce individual assembled tray groups, (g) introducing the preformed web with its array of molded trays as a group in a longitudinal direction to a conveying mechanism, (h) transferring the array of grouped trays transversely from the conveying mechanism onto a table to form superposed piles of assembled tray groups, (i) longitudinally moving the assembled pile of trays onto a second conveying mechanism, and thereafter, (j) cutting the pile of web sections transversely between the respective adjoining edges of the array of trays to form piles of individual trays.

References Cited

UNITED STATES PATENTS

| | | | |
|---|---|---|---|
| 1,957,864 | 5/1934 | Tuttle et al. | 83—408 X |
| 3,388,626 | 6/1968 | Larson | 83—302 X |
| 3,454,693 | 7/1969 | Crenshaw | 264—151 |
| 2,258,808 | 10/1941 | Polley | 83—29 X |
| 3,026,566 | 3/1962 | Martelli et al. | 18—19 |
| 3,327,344 | 6/1967 | O'Brien et al. | 18—19 |
| 3,479,694 | 11/1969 | Winstead | 83—914 X |
| 3,381,076 | 4/1968 | Govatos | 264—160 X |

FOREIGN PATENTS

| | | | |
|---|---|---|---|
| 591,008 | 4/1959 | Italy | 18—19 |
| 1,435,668 | 3/1966 | France | 18—19 F |

JAMES M. MEISTER, Primary Examiner

U.S. Cl. X.R.

83—44, 302, 408, 917; 264—92, 160